United States Patent
Hsu et al.

(10) Patent No.: US 8,266,370 B2
(45) Date of Patent: Sep. 11, 2012

(54) METHOD FOR PROCESSING DATA OF FLASH MEMORY BY SEPARATING LEVELS AND FLASH MEMORY DEVICE THEREOF

(75) Inventors: Chin-Tung Hsu, Taoyuan County (TW); Tsung-Ming Chang, Taichung (TW)

(73) Assignee: Innostor Technology Corporation, Jhubei, Hsinchu County (TW)

(*) Notice: Subject to any disclaimer, the term of this patent is extended or adjusted under 35 U.S.C. 154(b) by 478 days.

(21) Appl. No.: 12/647,505

(22) Filed: Dec. 27, 2009

(65) Prior Publication Data
US 2010/0180071 A1 Jul. 15, 2010

(30) Foreign Application Priority Data
Jan. 13, 2009 (TW) .............................. 98101031 A

(51) Int. Cl.
*G06F 12/00* (2006.01)
(52) U.S. Cl. ........ 711/103; 711/207; 711/156; 711/206; 710/60; 710/315; 365/185.29
(58) Field of Classification Search .................. None
See application file for complete search history.

(56) References Cited

U.S. PATENT DOCUMENTS

| | | | |
|---|---|---|---|
| 6,970,957 B1 * | 11/2005 | Oshins et al. .................. 710/60 |
| 7,093,101 B2 * | 8/2006 | Aasheim et al. .............. 711/207 |
| 7,139,883 B2 * | 11/2006 | Aasheim et al. ............... 711/156 |
| 7,284,083 B2 * | 10/2007 | Oshins et al. .................. 710/315 |
| 2005/0198596 A1 * | 9/2005 | Oshins et al. ...................... 716/3 |
| 2008/0235486 A1 * | 9/2008 | Sepulveda ..................... 711/206 |
| 2009/0154254 A1 * | 6/2009 | Wong et al. .............. 365/185.29 |

OTHER PUBLICATIONS

Alex Duan, "Flash Disk—Flash Translation Layer (FTL)", Sep. 3, 2006, pp. 1-3, http://bhduan.blogspot.com/2006/09/flash-block-driver-flashdisk.html.*

* cited by examiner

*Primary Examiner* — Edward Dudek, Jr.
*Assistant Examiner* — Christopher Birkhimer
(74) *Attorney, Agent, or Firm* — Pai Patent & Trademark Law Firm; Chao-Chang David Pai

(57) ABSTRACT

The present invention discloses a method for processing data of a flash memory by differentiating levels, which includes steps of separating the communication between a host and a flash memory by a high-level translation layer (HTL) and a low-level abstraction layer (LAL). The HTL receives commands and logical addresses from the host and translates the received logical addresses to the physical addresses of the flash memory. The LAL executes data processing to the corresponding memory cells according to the commands and the physical addresses from the HTL. Since the LAL is disposed between the HTL and the flash memory, the HTL is irrelevant to the structure of the flash memory, and does not have to re-designed with the flash memory which is replaced with another new flash memory.

39 Claims, 8 Drawing Sheets

US 8,266,370 B2

METHOD FOR PROCESSING DATA OF FLASH MEMORY BY SEPARATING LEVELS AND FLASH MEMORY DEVICE THEREOF

BACKGROUND OF THE INVENTION

1. Field of the Invention

The present invention relates to a method for processing data of flash memory and flash memory device thereof, and more particularly to a method for processing data of flash memory by separating levels and flash memory device thereof.

2. Description of Related Art

Flash memory pertains to a non-violate solid state memory, and in contrast to the conventional non-violate solid state memory, it is advantageous in low unit storage cost and high read/write speed. Besides, flash memory has better shock resistance in comparison with a hard disk; in other words, the stored data therein is not easily damaged due to shock. For sake of the aforementioned nature, flash memory is often adopted in a portable device (e.g. MP3, digital camera, mobile phone, memory card and USB flash drive) as a storage medium.

Flash memory has many different types, for example, SLC (Single Level Cell) small block flash memory, SLC large block flash memory, MLC (Multi-Level Cell) large block flash memory, and so forth. Flash memory is made by various manufacturers, such as Samsung, Hynix, Toshiba, and so forth. Different types of flash memories or flash memories from different vendors have different structures and different control methods. For example, each block of the SLC small block flash memory contains 32 pages, and each page contains 528 bytes, in which the leading 512 bytes and the trailing 16 bytes are categorized as the data area and the spare area respectively, while each block of the SLC large block flash memory contains 64 pages, and each page contains 2112 bytes, in which the leading 2048 bytes and the trailing 64 bytes are categorized as the data area and the spare area respectively.

Please refer to FIG. 1, which is a schematic view illustrating a flash translation layer (FTL) of prior art. The FTL is electronically connected between a host H and a flash memory $M_{F1}$.

The flash memory $M_{F1}$ includes M×N blocks ($BL_{11}$~$BL_{MN}$). The FTL is used to receive or respond to the request from the host H so as to process the data in the flash memory $M_{F1}$. Moreover, the host can be an application program and/or a filing system over a user end.

The FTL reads hardware structure information $D_{SPEC}$ in the flash memory $M_{F1}$. More specifically, the FTL reads the model number $ID_{FLASH}$ of the flash memory $M_{F1}$ to acquire the type (e.g. SLC large block), manufacturer (e.g. Samsung), structure (e.g. size of block), capacity, control method, and so forth of the flash memory $M_{F1}$ The FTL, in accordance with the structure of the flash memory $M_{F1}$ described in the hardware structure information $D_{SPEC}$, converts a logical address into a physical address corresponding to a physical storage unit of the flash memory $M_{F1}$, and then identifies the control method corresponding to the flash memory $M_{F1}$ to control the flash memory $M_{F1}$ for data processing, so that the host H can request the flash memory $M_{F1}$ through the FTL to perform a data processing operation. As an example, when the host H issues a request to the flash memory $M_{F1}$ to perform a data processing operation and transmits a logical address "P" (representing a value) to the FTL, the FTL converts the logical address "P" into a physical address "X" and request to perform the data processing operation in the block $BL_X$ of the flash memory $M_{F1}$.

What worth mentioning is that the FTL is required to directly control the flash memory $M_{F1}$, and as a result, the FTL needs to be designed according to the control method and structure of the flash memory $M_{F1}$. However, flash memories from different manufacturers or different types of flash memories own different control methods and structures. In that sense, whenever a flash memory $M_{F1}$ (e.g. flash memory produced by Samsung) is replaced by a new flash memory $M_{F2}$ (e.g. flash memory produced by Toshiba), the FTL needs to be re-designed in accordance with the control method and structure of the new flash memory $M_{F2}$, thus giving rise to tremendous inconvenience to user.

To overcome the shortcomings, the present invention provides a method for processing data of flash memory by separating levels and flash memory device thereof to mitigate or obviate the aforementioned problems.

SUMMARY OF THE INVENTION

The main objective of the present invention is to provide a method for processing data of flash memory by separating levels, comprising steps of: sending a logical address to a high-level translation layer (HTL) to require a data processing operation performed in a flash memory; obtaining a hardware structure information of the flash memory by a low-level abstraction layer (LAL) and then sending the hardware structure information to the HTL; setting a physical storage unit in the flash memory according to the hardware structure information by the HTL; identifying a physical storage unit in a set of physical storage units available to the data processing operation in accordance with the spare data by the HTL; determining a data processing flow in accordance with the hardware structure information by the HTL to convert the logical address into a physical address corresponding to the physical storage unit available to the data processing operation; and performing the data processing operation in the physical storage unit available to the data processing operation by the LAL in accordance with the physical address transmitted from the HTL, wherein the HTL is used to allow a client's application program and a file system to perform the data processing action in the flash memory, and collect related information about usage status of the flash memory to manage the flash memory, and LAL obtains a bank according to a first sub-address of the physical address, a block according to a second sub-address, a page according to a third sub-address, and a channel according to a fourth sub-address.

The second objective of the present invention is to provide another method for processing data of flash memory by separating levels, comprising steps of sending a logical address to a high-level translation layer (HTL) to require a data processing operation performed in a flash memory; obtaining a hardware structure information of the flash memory by a flash abstraction layer and then sending the hardware structure information to the HTL; setting a physical storage unit in the flash memory according to the hardware structure information by the HTL; identifying a physical storage unit in a set of physical storage units available to the data processing operation in accordance with the spare data by the HTL; determining a data processing flow in accordance with the hardware structure information by the HTL to convert the logical address into a physical address corresponding to the physical storage unit available to the data processing operation; and performing the data processing operation in the physical storage unit available to the data processing operation by the flash abstraction layer in accordance with the physical address transmitted from the HTL; wherein the HTL is used to allow a client's application program and a file system to perform the data processing action in the flash memory, and collect related information about usage status of the flash memory to manage the flash memory, and flash abstraction layer obtains a bank according to a first sub-address of the physical address, a block according to a second sub-address, a page according to a third sub-address, a sector according to a fourth sub-address, and a channel according to a fifth sub-address.

The third objective of the present invention is to provide a device for processing data of flash memory by separating levels, comprising: a flash memory, a circuit for executing command and converting logical address and a circuit for executing command and addressing physical address. The circuit for executing command and converting logical address instructs a LAL to obtain hardware structure information of the flash memory and transmits the hardware structure information to the HTL, instructs the LAL to obtain a set of spare data of the flash memory and transmits the spare data to the HTL, instructs the HTL to receive a logical address and a request transmitted from a host for a data processing operation in the flash memory, and instructs the HTL to convert the logical address into an intermediate physical address in accordance with the hardware structure information, selects a set of physical storage units corresponding to the intermediate physical address in the plural blocks with a look-up table in the HTL, identifies a physical storage unit in the set of physical storage units available to the data processing operation in accordance with the spare data, and determines a data processing flow in accordance with the hardware structure information and the spare data to convert the logical address to a physical address corresponding to the physical storage unit available to the data processing operation. The circuit for executing command and addressing physical address is used for instructing the LAL to perform the data processing operation in the physical storage unit available to the data processing operation in accordance with the physical address transmitted from the HTL.

Based on the foregoing description, the HTL is electronically connected between the host and the LAL to prevent the request from the host from directly entering the LAL. The LAL is electronically connected between the HTL and the flash memory to prevent the commands issued from the HTL from directly entering the flash memory.

Other objectives, advantages and novel features of the invention will become more apparent from the following detailed description when taken in conjunction with the accompanying drawings.

DETAILED DESCRIPTION OF THE PREFERRED EMBODIMENT

In view of the foregoing concern, the present invention separates the FTL into a high-level translation layer (HTL) and a low-level abstraction layer (LAL) to resolve the issue that the entire FTL must be re-designed when an old flash memory originally in use is replaced by another new type of a flash memory, in which the LAL can be a flash abstraction layer (FAL), and the HTL can be a flash translation layer (FTL).

Figure 1:
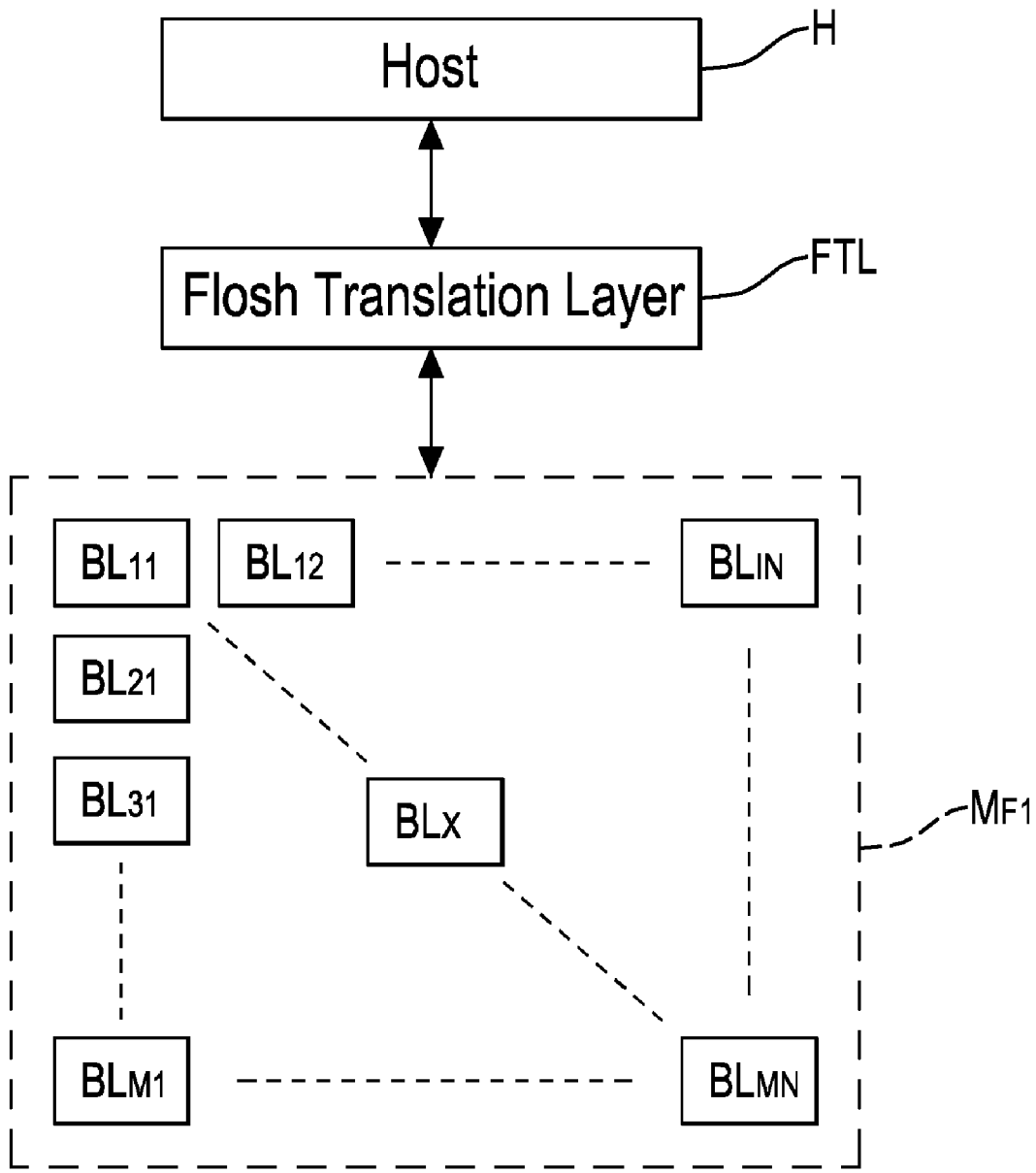
FIG. 1 is a schematic view illustrating the FTL of the prior art.
Figure 2:
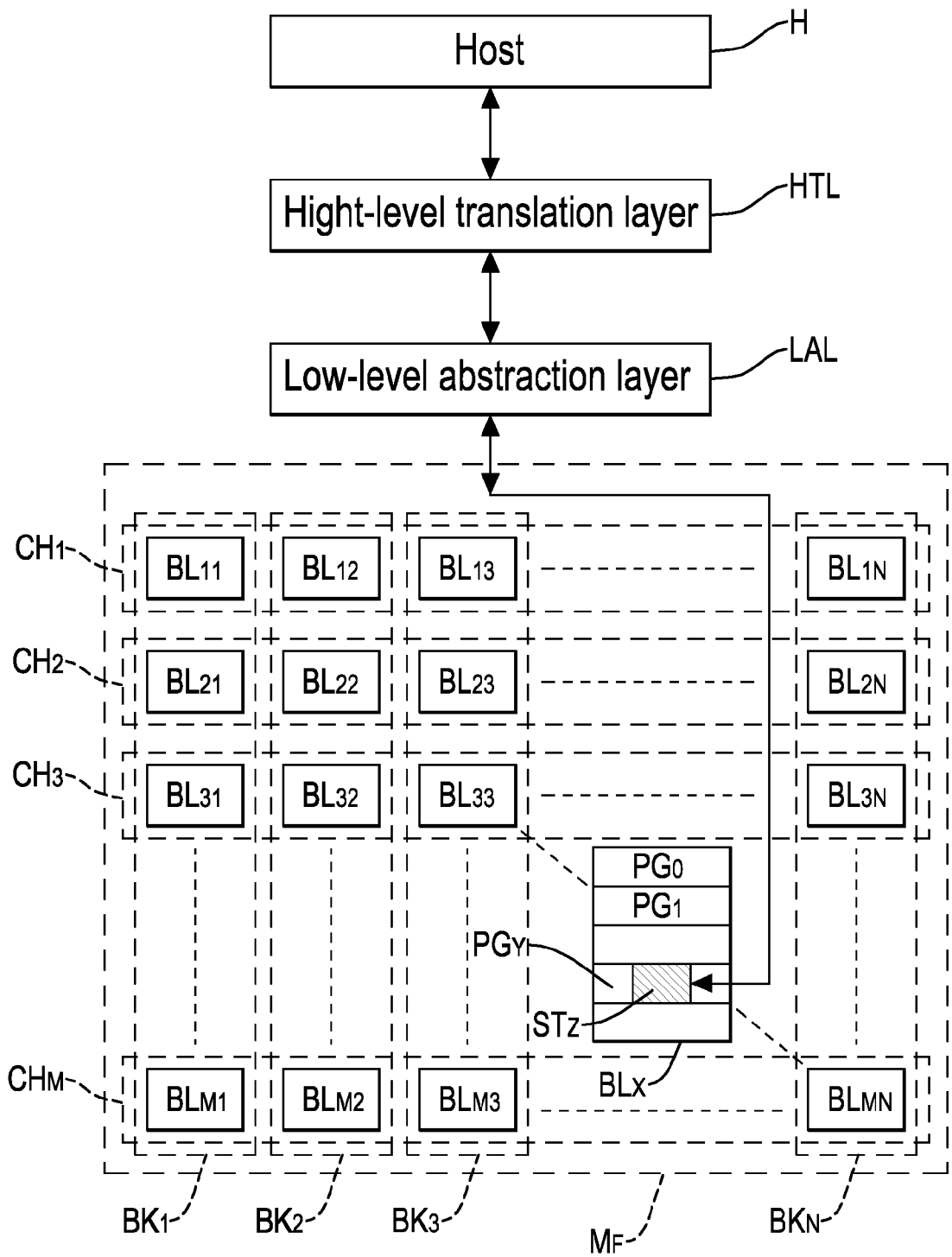
FIG. 2 is a schematic view illustrating data processing of a flash memory by separating levels in accordance with the present invention.

With reference to FIG. 2, which is a schematic view illustrating data processing of the flash memory $M_F$ by separating levels in accordance with the present invention. The HTL is electronically connected between a host (H) and the LAL, and the LAL is electronically connected between the HTL and the flash memory ($M_F$). The design of the HTL is uncorrelated with a control method of the flash memory ($M_F$), while the design of the LAL shall vary with the type of the flash memory ($M_F$). The flash memory ($M_F$) is planed to have CH, BK, BL, PG and ST illustrated in FIG. 2 represent 'channel', 'bank', 'block', 'page' and 'sector' respectively.

The FTL allows the host (H) (e.g. an application program and/or a filing system at a user end) to perform data processing in the flash memory ($M_F$), collect status information pertinent to the operation of the flash memory $M_F$, and manage the flash memory ($M_F$). In addition, the FTL prevents a request issued by the host H from directly entering the LAL.

The LAL, where is located between the HTL and the flash memory ($M_F$), serves to execute the command issued by the HTL and transmit the hardware to structure information $D_{SPEC}$ of the flash memory ($M_F$) and the $D_{SP}$ (spare data) obtained from the flash memory ($M_F$) to the HTL. Similarly, the LAL can acquire a type (e.g. SLC large block), a manufacturer (e.g. Samsung), structure (e.g. size of block), a capacity, a control method in association with the flash memory ($M_F$) by reading the model number $ID_{FLASH}$ of the flash memory ($M_F$). Moreover, the LAL prevents the command issued by the HTL from directly entering the flash memory ($M_F$).

Because the LAL blocks the direct communication between the HTL and the flash memory (i.e. the LAL will control the flash memory ($M_F$) in accordance with the command issued by the HTL, and the command issued by the HTL is unable to be directly transmitted to the flash memory ($M_F$)), the HTL won't be affected regardless if the old flash memory ($M_F$) is substituted with a new type of another flash memory. Therefore, the issue of the HTL arising from the replacement of the flash memory ($M_F$) can be eliminated.

Figure 3:
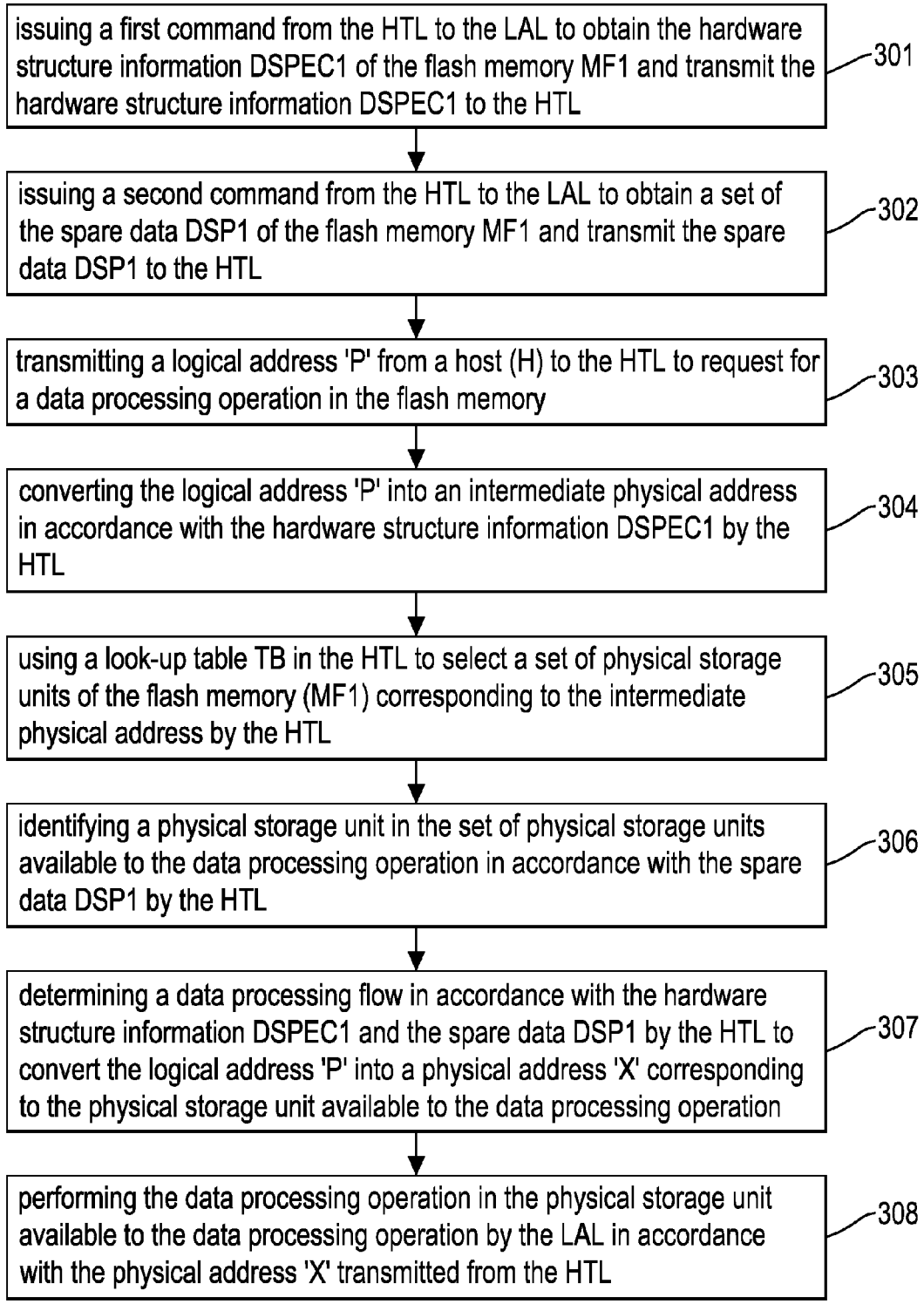
FIG. 3 is a flow chart illustrating a method for processing data of the flash memory by separating levels in accordance with the present invention.

With reference to FIG. 3, which is a flow diagram illustrating a method 300 for processing data of the flash memory ($M_F$) by separating levels in accordance with the present invention. The method has the following steps:

STEP 301: issuing a first command from the HTL to the LAL to obtain the hardware structure information $D_{SPEC1}$ of the flash memory $M_{F1}$ and transmit the hardware structure information $D_{SPEC1}$ to the HTL;

STEP 302: issuing a second command from the HTL to the LAL to obtain a set of the spare data $D_{SP1}$ of the flash memory $M_{F1}$ and transmit the spare data $D_{SP1}$ to the HTL;

STEP 303: transmitting a logical address 'P' from a host (H) to the HTL to request for a data processing operation in the flash memory ($M_{F1}$);

STEP 304: converting the logical address 'P' into an intermediate physical address in accordance with the hardware structure information $D_{SPEC1}$ by the HTL;

STEP 305: using a look-up table $T_B$ in the HTL to select a set of physical storage units of the flash memory ($M_{F1}$) corresponding to the intermediate physical address by the HTL;

STEP 306: identifying a physical storage unit in the set of physical storage units available to the data processing operation in accordance with the spare data $D_{SP1}$ by the HTL;

STEP 307: determining a data processing flow in accordance with the hardware structure information $D_{SPEC1}$ and the spare data $D_{SP1}$ by the HTL to convert the logical address 'P' into a physical address 'X' corresponding to the physical storage unit available to the data processing operation; and STEP 308: performing the data processing operation in the physical storage unit available to the data processing operation by the LAL in accordance with the physical address 'X' transmitted from the HTL.

Based on the foregoing description, the HTL is electronically connected between the host (H) and the LAL to prevent the request from the host (H) from directly entering the LAL, and the LAL is electronically connected between the HTL and the flash memory ($M_F$) to prevent the commands issued from the HTL from directly entering the flash memory ($M_F$).

When a new flash memory replaces the original one in the method 300, the method 300 will provide a new low-level abstraction layer ($LAL_2$) to replace the original LAL, and obtain a new hardware structure information and the spare data of the new flash memory and transmit them to the HTL. In other words, when the new flash memory replaces the original one, the STEP 301~307 will be resumed so as to inform that the HTL needs to convert the logical address 'P' into the physical address 'X' once again. Therefore, the original HTL is not replaced for the new flash memory.

In the STEP 308, the LAL actually corresponds the physical address 'X' transmitted from the HTL to a channel (CH), a bank (BK), a block (BL), a page (PG) and a sector (ST) in the flash memory $M_{F1}$. That is to say, the physical address can be classified into five sub-addresses, i.e. ($x_1$, $x_2$, $x_3$, $x_3$, $x_5$). The first sub-address '$x_1$' represents a channel physically allocated in the flash memory ($M_F$); the second sub-address '$x_2$' represents a bank physically allocated in the flash memory ($M_F$); the third sub-address '$x_3$' represents a block physically allocated in the flash memory ($M_F$); the fourth sub-address '$x_4$' represents a page physically allocated in the flash memory ($M_F$); the fifth sub-address '$x_5$' represents a sector physically allocated in the flash memory ($M_F$). For example, if the physical address 'X' is (1, 1, 1, 1, 1), it represents a physical storage unit physically available to a data processing operation, where is located at $CH_1$, $BK_1$, $BL_1$, $PG_1$ and $ST_1$ in the flash memory ($M_F$).

Furthermore, the hardware structure information $D_{SPEC}$ provides the information about numbers of the channel, the bank, the block, the page, and the sector planned in the flash memory ($M_F$). The hardware structure information, e.g. (10, 10, 10, 64, 4), represents that there are 10 channels, each channel contains 10 banks, each bank contains 10 blocks, each block contains 64 pages, and each page contains 4 sectors in the flash memory ($M_F$). In general, the size of the sector is defined to be 512 bytes; therefore, it is not a must to be provided in the hardware structure information $D_{SPEC}$.

Accordingly, the HTL can convert the logical address 'P' into a corresponding intermediate physical address in accordance with the hardware structure information $D_{SPEC}$. Given the hardware structure information $D_{SPEC1}$ (10, 10, 10, 64, 4) as mentioned earlier and the logical address 'P' [123456], the HTL can obtain a quotient 4, which represents the first sub-address $x_1$, and a remainder 21056 by dividing [123456] by 25600 (i.e. 10×10×64×4 bytes, being the size of the channel); a quotient 8, which represents the second sub-address $x_2$, and a remainder 576 by dividing [21056] by 2560 (i.e. 10×64×4 bytes, being the size of the bank); a quotient 2, which represents the third sub-address $x_3$, and a remainder 64 by dividing [576] by 256 (i.e. 64×4 bytes, being the size of the block); a quotient 16, which represents the fourth sub-address $x_4$, and a remainder 0 by dividing [64] by 4 (i.e. the size of the page). To put it simply, when the logical address 'P' is [123456], the intermediate physical address converted by the HTL in accordance with the hardware structure information $D_{SPEC1}$ is (4, 8, 2, 16, 0), which represents the first sector ($ST_0$) of the seventeen page ($PG_{16}$) of the third block ($BL_2$) of the ninth bank ($BK_8$) of the fifth channel ($CH_4$) in the flash memory $M_{F1}$.

Whereas, a block in the flash memory ($M_F$) stored with data can't be written again. More specifically, if intending to write data in a bank already stored with data, it is necessary to erase a block pertaining to the bank. Each operation of erasing data is based on a unit of the block. That is to say, each operation of erasing data shall at least erase a block instead of erasing a page or a byte. Consequently, to speed up the data processing operation of the host (H) with respect to the flash memory $M_{F1}$ a look-up table $T_B$ is disposed in the HTL for selecting a physical storage unit without data stored therein in the block corresponding to the same physical address to perform the data processing operation. More precisely, when the HTL converts the logical address 'P' into a intermediate physical address, the converted third sub-address $x_3$ is mapped to two different blocks but a single block directly. One of the blocks available to the data processing operation is chosen in accordance with the spare data $D_{SP}$ provided by the flash memory ($M_{F1}$). The spare data $D_{SP}$ is used for determining if the physical storage unit intended to be processed contains data therein, thereby facilitating the HTL to select the physical storage unit without data stored therein. More details depicting the operation principle are provided as follows.

Figure 4:
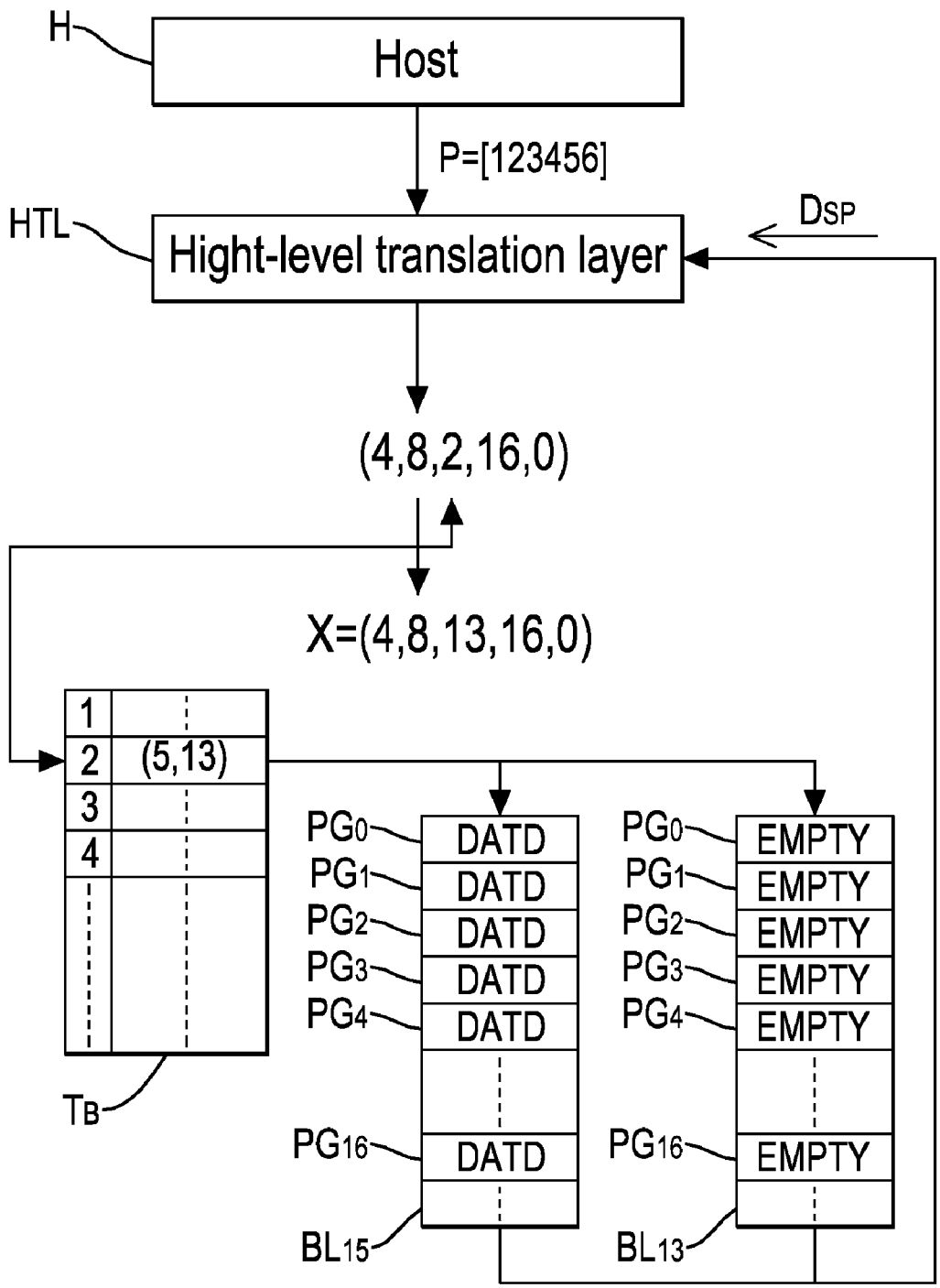
FIG. 4 is a schematic view illustrating that the HTL of the present invention identifies a physical storage unit physically available to data processing in accordance with the logical address, spare data and a look-up table.

With reference to FIG. 4, which is a schematic view illustrating that the HTL of the present invention identifies the physical storage unit physically available to data processing in accordance with the logical address, spare data and look-up table. Likewise, given the same example of the logical address 'P' [123456], the third sub-address $x_3$ ('2') is obtained. The blocks corresponding to the third sub-address $x_3$ and identified from the second row of the look-up table $T_B$, are $BL_5$ and $BL_{13}$. The physical storage unit actually intended for data processing is located at the first sector ($ST_0$) of the seventeen page ($PG_{16}$). However, what the spare data disclose is that the seventeen page ($PG_{16}$) of the block ($BL_5$) already has data therein while the seventeen page ($PG_{16}$) of the block ($BL_{13}$) has no data therein. Therefore, the HTL selects the block ($B_{13}$) as the actual physical storage unit for the data processing operation to be performed, meaning that the logical address 'P' [123456] is first mapped to the intermediate physical address (4, 8, 2, 16, 0) and then further mapped to the physical address 'X' (4, 8, '13', 16, 0) instead of the intermediate physical address (4, 8, '2', 16, 0) or (4, 8, '5', 16, 0) after the processing of the HTL. At last, the physical storage unit identified through the HTL is located at the first sector ($ST_0$) of the seventeen page ($PG_{16}$) of the fourteen block ($B_{13}$) of the ninth bank ($BK_8$) of the fifth channel ($CH_5$) in the flash memory ($M_F$).

The data processing flow in the STEP 307 is employed to determine the sequence how the LAL fetches the first sub-address $x_1$, the second sub-address $x_2$, the third sub-address $x_3$, the fourth sub-address $x_4$ and the fourth sub-address $x_5$.

Figure 5:
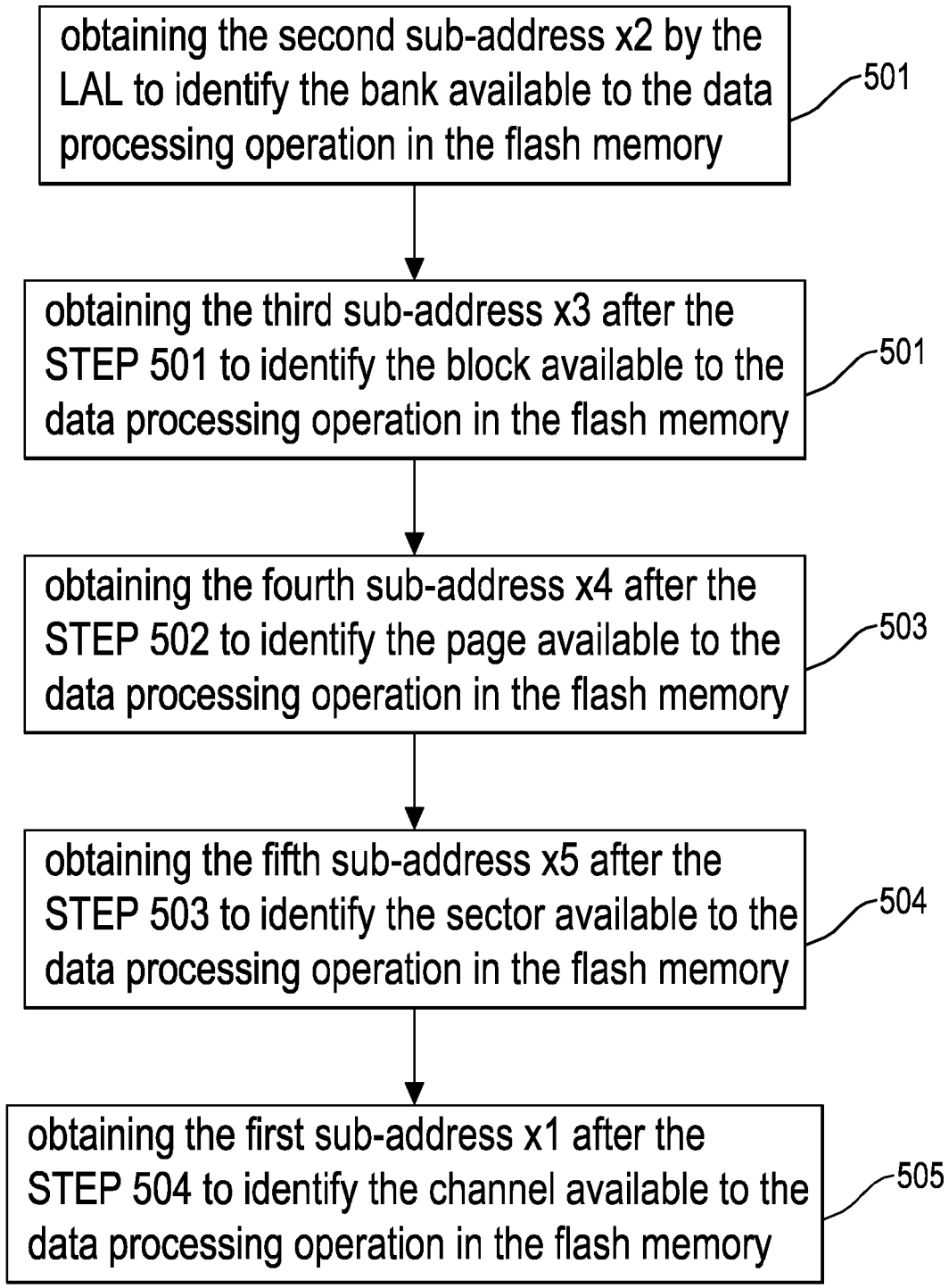
FIG. 5 is a flow chart of the first preferred embodiment for data processing flow in accordance with the present invention.

With reference to FIG. 5, which is a flow diagram of the first preferred embodiment for data processing flow in accordance with the present invention. The steps of the flow are listed below:

STEP 501: obtaining the second sub-address $x_2$ by the LAL to identify the bank available to the data processing operation in the flash memory ($M_F$);

STEP 502 obtaining the third sub-address $x_3$ after the STEP 501 to identify the block available to the data processing operation in the flash memory ($M_F$);

STEP 503: obtaining the fourth sub-address $x_4$ after the STEP 502 to identify the page available to the data processing operation in the flash memory ($M_F$);

STEP 504: obtaining the fifth sub-address $x_5$ after the STEP 503 to identify the sector available to the data processing operation in the flash memory ($M_F$); and STEP 505: obtaining the first sub-address $x_1$ after the STEP 504 to identify the channel available to the data processing operation in the flash memory ($M_F$).

Figure 6:
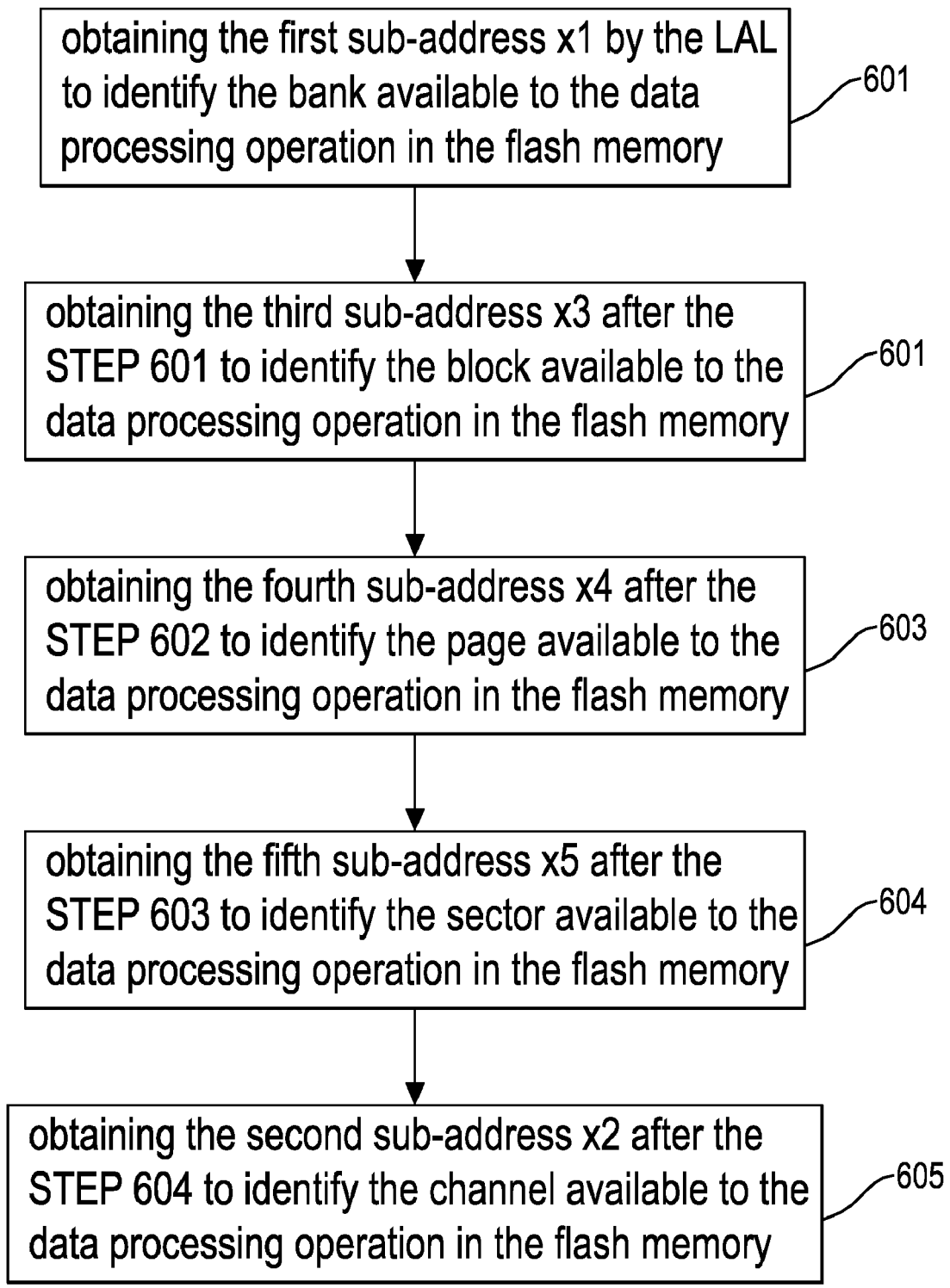
FIG. 6 is a flow chart of the second preferred embodiment for data processing flow in accordance with the present invention.

Please refer to FIG. 6, which is a flow diagram of the second preferred embodiment for data processing flow in accordance with the present invention. The steps of the flow are listed below:

STEP 601: obtaining the first sub-address $x_1$ by the LAL to identify the bank available to the data processing operation in the flash memory ($M_F$);

STEP 602 obtaining the third sub-address $x_3$ after the STEP 601 to identify the block available to the data processing operation in the flash memory ($M_F$);

STEP 603: obtaining the fourth sub-address $x_4$ after the STEP 602 to identify the page available to the data processing operation in the flash memory ($M_F$);

STEP 604: obtaining the fifth sub-address $x_5$ after the STEP 603 to identify the sector available to the data processing operation in the flash memory ($M_F$); and STEP 605: obtaining the second sub-address $x_2$ after the STEP 604 to identify the channel available to the data processing operation in the flash memory ($M_F$).

Figure 7:
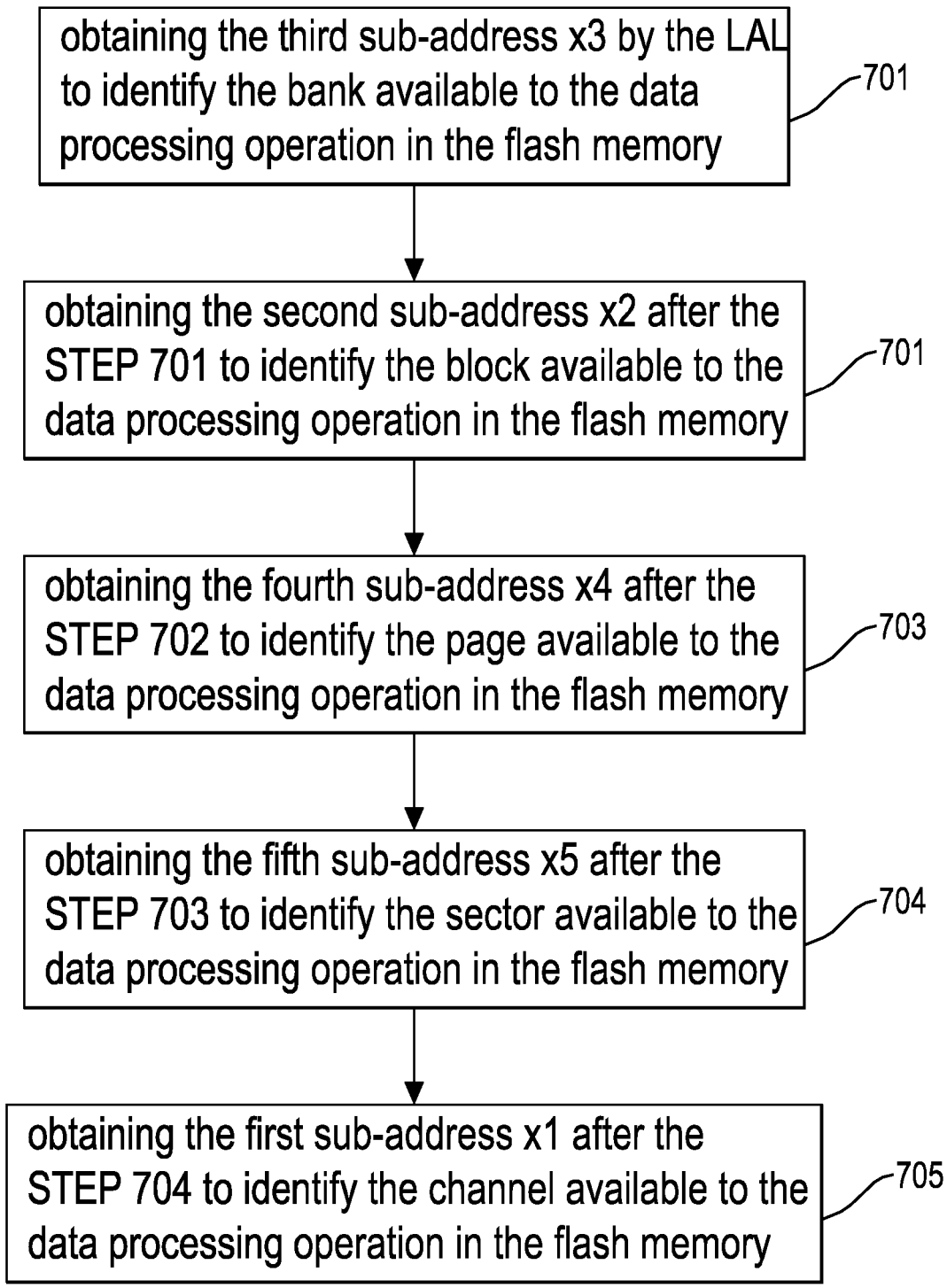
FIG. 7 is a flow chart of the third preferred embodiment for data processing flow in accordance with the present invention.

Please refer to FIG. 7, which is a flow diagram of the third preferred embodiment for data processing flow in accordance with the present invention. The steps of the flow are listed below:

STEP 701: obtaining the third sub-address $x_3$ by the LAL to identify the bank available to the data processing operation in the flash memory $M_{F1}$;

STEP 702 obtaining the second sub-address $x_2$ after the STEP 701 to identify the block available to the data processing operation in the flash memory ($M_F$);

STEP 703: obtaining the fourth sub-address $x_4$ after the STEP 702 to identify the page available to the data processing operation in the flash memory ($M_F$);

STEP 704: obtaining the fifth sub-address $x_5$ after the STEP 703 to identify the sector available to the data processing operation in the flash memory ($M_F$); and STEP 705: obtaining the first sub-address $x_1$ after the STEP 704 to identify the channel available to the data processing operation in the flash memory ($M_F$).

Among the three embodiments of the data processing flow, the fifth sub-address is not definitely necessary, that is to say, it is not mandatory that the LAL need to perform the data processing operation based on the unit of the sector. In other words, if the physical address that the LAL receives only addresses to the page, the LAL performs the data processing operation based on the unit of the page; if the physical address that the LAL receives only addresses to the sector, the LAL performs the data processing operation based on the unit of the sector. Meanwhile, the third sub-address $x_3$ is the final sub-address obtained by the HTL in accordance with the logical address 'P', the look-up table $T_B$ and the spare data $D_{SP}$.

Figure 8:
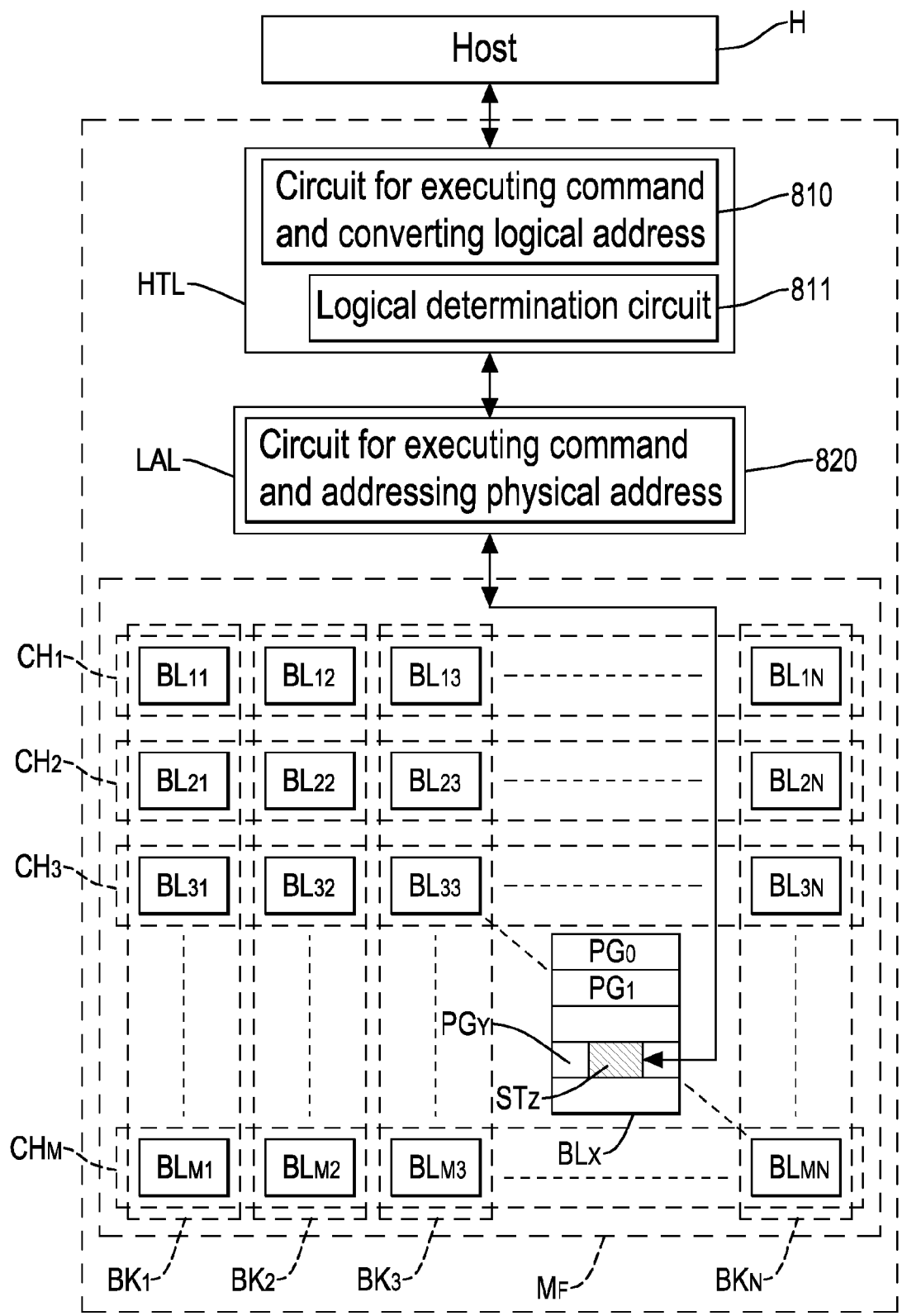
FIG. 8 is a schematic view showing a flash memory device for processing data of the flash memory by separating levels in accordance with the present invention.

With reference to FIG. 8, which is a schematic view showing the flash memory device for processing data of flash memory ($M_F$) by separating levels in accordance with the present invention. The flash memory device 800 has a circuit for executing command and converting logical address 810, a circuit for executing command and addressing physical address 820, and a flash memory ($M_F$), in which the flash memory ($M_F$) contains a plurality of blocks ($BL_{11}$~$BL_{MN}$).

The circuit for executing command and converting logical address (810) is located at the HTL, and the circuit for executing command and addressing physical address (820) is electronically connected to the LAL. The circuit for executing command and converting logical address (810) is further electronically connected to a logical determination circuit (811). The operation principle of the host (H), the HTL, the LAL and the flash memory ($M_F$) in FIG. 8, which is the same as that mentioned earlier, won't not repeated here.

The circuit for executing command and converting logical address (810) is used to execute the following operations:

1. instructing the LAL to obtain hardware structure information of the flash memory ($M_F$) and transmit the hardware structure information to the HTL;

2. instructing the LAL to obtain a set of spare data of the flash memory ($M_F$) and transmit the spare data to the HTL;

3. instructing the HTL to receive a logical address transmitted from a host (H) to request for a data processing operation in the flash memory ($M_F$);

4. instructing the HTL to convert the logical address into an intermediate physical address in accordance with the hardware structure information;

5. instructing the HTL select a set of physical storage units corresponding to the intermediate physical address in the plural blocks with a look-up table in the HTL;

6. instructing the HTL to identify a physical storage unit in the set of physical storage units available to the data processing operation in accordance with the spare data; and 7. instructing the HTL to determine a data processing flow in accordance with the hardware structure information and the spare data to convert the logical address to a physical address corresponding to the physical storage unit available to the data processing operation.

The HTL is located between the host (H) and the LAL to prevent the request issued from the host (H) from directly entering the LAL, and the LAL is located between the HTL and the flash memory ($M_F$) to prevent the commands issued from the HTL from directly entering the flash memory ($M_F$).

The circuit for executing command and addressing physical address (820) is used for the LAL to perform the data processing operation in the physical storage unit available to the data processing operation in accordance with the physical address 'X' transmitted from the HTL.

The logical determination circuit (811) is used to execute the following operations:

1. commanding the HTL to instruct the LAL to obtain one of the hardware structure information $D_{SPEC}$ and the spare data $D_{SP}$;
2. instructing the LAL to read and transmit one of the hardware structure information $D_{SPEC}$ and the spare data $D_{SP}$ to the HTL in accordance with the command; and
3. instructing the HTL to determine the data processing flow in accordance with the hardware information $D_{SPEC}$ and the spare data $D_{SP}$ to convert the logical address 'P' into the physical address 'X'.

In sum, the present invention resolves the issue of the prior art that entire FTL must be re-designed when the flash memory originally in use is replaced by another new type of flash memory, by separating the FTL into the HTL and the LAL. Besides, the corresponding control method chosen from various different flash memories is adopted by virtue of the LAL provided by the present invention to directly perform a data processing operation in a storage unit corresponding to the physical address given by the HTL. As such, the invention provides the practical value to the industry and the application is hereby submitted in accordance with the patent laws.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method for processing data of flash memory by separating levels, comprising steps of:
   sending a logical address to a high-level translation layer (HTL) to require a data processing operation performed in a flash memory;
   obtaining a hardware structure information of the flash memory by a low-level abstraction layer (LAL) and then sending the hardware structure information to the HTL;
   setting a physical storage unit in the flash memory according to the hardware structure information by the HTL;
   identifying a physical storage unit in a set of physical storage units available to the data processing operation in accordance with the spare data by the HTL;
   determining a data processing flow in accordance with the hardware structure information by the HTL to convert the logical address into a physical address corresponding to the physical storage unit available to the data processing operation; and
   performing the data processing operation in the physical storage unit available to the data processing operation by the LAL in accordance with the physical address transmitted from the HTL;
   wherein the HTL is used to allow a client's application program and a file system to perform the data processing action in the flash memory, and collect related information about usage status of the flash memory to manage the flash memory, and LAL obtains a bank according to a first sub-address of the physical address, a block according to a second sub-address, a page according to a third sub-address, and a channel according to a fourth sub-address.

2. The method as claimed in claim 1, further comprising:
   sending a first command from the HTL to instruct the LAL to obtain the hardware structure information; and
   reading the hardware structure information of the flash memory according to the first command by LAL by the LAL and then sending the hardware structure information to HTL.

3. The method as claimed in claim 2, further comprising:
   sending a second command from the HTL to instruct the LAL to obtain a spare data;
   reading the spare data of the flash memory according to the second command and then sending the spare data to HTL; and
   determining a data processing flow to covert the physical address by the HTL according to the hardware structure information and spare data.

4. The method as claimed in claim 1, wherein the HTL is used to isolate an application program and requirement of entering the LAL sent from a file system.

5. The method as claimed in claim 1, wherein the LAL is located between the HTL and the flash memory to perform commands from the HTL and sends the hardware structure information and a spare data obtained from the flash memory to the HTL.

6. The method as claimed in claim 1, wherein the LAL executes commands from the HTL to avoid the commands of the HTL directly entering the flash memory and sends the hardware structure and spare data of the flash memory to the HTL.

7. The method as claimed in claim 1, wherein the LAL is replaced by a new LAL when the flash memory is replaced by a new flash memory, so that the new LAL obtains a new hardware structure information of the new flash memory and transmits the new hardware structure information to the HTL.

8. The method as claimed in claim 1, wherein the hardware structure information provides information to plan the flash memory to comprise a size of a bank, a size of a block, a size of a page, and a size of a channel.

9. The method as claimed in claim 8, wherein the data processing flow determines a sequence how the LAL fetches the first sub-address, the second sub-address, the third sub-address and the fourth sub-address.

10. The method as claimed in claim 9, wherein the data processing flow comprises:
    (a) obtaining the first sub-address by the LAL to identify the bank available to the data processing operation in the flash memory;
    (b) obtaining the second sub-address after the step (a) to identify the block available to the data processing operation in the flash memory;
    (c) obtaining the third sub-address after the step (b) to identify the page available to the data processing operation in the flash memory; and
    (d) obtaining the fourth sub-address after the step (c) to identify the channel available to the data processing operation in the flash memory.

11. The method as claimed in claim 9, wherein the data processing flow comprises:
    (a) obtaining the fourth sub-address by the LAL to identify the channel available to the data processing operation in the flash memory;
    (b) obtaining the second sub-address after the step (a) to identify the block available to the data processing operation in the flash memory;
    (c) obtaining the third sub-address after the step (b) to identify the page available to the data processing operation in the flash memory; and
    (d) obtaining the first sub-address after the step (c) to identify the bank available to the data processing operation in the flash memory.

12. The method as claimed in claim 9, wherein the data processing flow comprises:
(a) obtaining the second sub-address by the LAL to identify the block available to the data processing operation in the flash memory;
(b) obtaining the first sub-address after the step (a) to identify the bank available to the data processing operation in the flash memory;
(c) obtaining the third sub-address after the step (b) to identify the page available to the data processing operation in the flash memory; and
(d) obtaining the fourth sub-address after the step (c) to identify the channel available to the data processing operation in the flash memory.

13. The method as claimed in claim 1, wherein the LAL is a flash abstraction layer.

14. A method for processing data of flash memory by separating levels, comprising steps of:
sending a logical address to a high-level translation layer (HTL) to require a data processing operation performed in a flash memory;
obtaining a hardware structure information of the flash memory by a flash abstraction layer and then sending the hardware structure information to the HTL;
setting a physical storage unit in the flash memory according to the hardware structure information by the HTL;
identifying a physical storage unit in a set of physical storage units available to the data processing operation in accordance with the spare data by the HTL;
determining a data processing flow in accordance with the hardware structure information by the HTL to convert the logical address into a physical address corresponding to the physical storage unit available to the data processing operation; and
performing the data processing operation in the physical storage unit available to the data processing operation by the flash abstraction layer in accordance with the physical address transmitted from the HTL;
wherein the HTL is used to allow a client's application program and a file system to perform the data processing action in the flash memory, and collect related information about usage status of the flash memory to manage the flash memory, and flash abstraction layer obtains a bank according to a first sub-address of the physical address, a block according to a second sub-address, a page according to a third sub-address, a sector according to a fourth sub-address, and a channel according to a fifth sub-address.

15. The method as claimed in claim 14, further comprising:
sending a first command from the HTL to instruct the flash abstraction layer to obtain the hardware structure information; and
reading the hardware structure information of the flash memory according to the first command by the flash abstraction layer and then sending the hardware structure information to HTL.

16. The method as claimed in claim 15, further comprising:
sending a second command from the HTL to instruct the flash abstraction layer to obtain a spare data;
reading the spare data of the flash memory according to the second command by the flash abstraction layer and then sending the spare data to HTL; and
determining a data processing flow to covert the physical address by the HTL according to the hardware structure information and spare data.

17. The method as claimed in claim 14, wherein the HTL is used to isolate an application program and requirement of entering the LAL sent from a file system.

18. The method as claimed in claim 14, wherein the flash abstraction layer is located between the HTL and the flash memory to perform commands from the HTL and sends the hardware structure information and a spare data obtained from the flash memory to the HTL.

19. The method as claimed in claim 14, wherein the flash abstraction layer executes commands from the HTL to avoid the commands of the HTL directly entering the flash memory and sends the hardware structure and spare data of the flash memory to the HTL.

20. The method as claimed in claim 14, wherein the flash abstraction layer is replaced by a new flash abstraction layer when the flash memory is replaced by a new flash memory, so that the new flash abstraction layer obtains a new hardware structure information of the new flash memory and transmits the new hardware structure information to the HTL.

21. The method as claimed in claim 14, wherein the hardware structure information provides information to plan the flash memory to comprise a size of a bank, a size of a block, a size of a page, a size of a sector, and a size of channel.

22. The method as claimed in claim 21, wherein the data processing flow determines a sequence how the flash abstraction layer fetches the first sub-address, the second sub-address, the third sub-address, the fourth sub-address and the fifth sub-address.

23. The method as claimed in claim 22, wherein the data processing flow comprises:
(a) obtaining the first sub-address by the flash abstraction layer to identify the bank available to the data processing operation in the flash memory;
(b) obtaining the second sub-address after the step (a) to identify the block available to the data processing operation in the flash memory;
(c) obtaining the third sub-address after the step (b) to identify the page available to the data processing operation in the flash memory;
(d) obtaining the fourth sub-address after the step (c) to identify the sector available to the data processing operation in the flash memory; and
(e) obtaining the fifth sub-address after the step (d) to identify the channel available to the data processing operation in the flash memory.

24. The method as claimed in claim 22, wherein the data processing flow comprises:
(a) obtaining the fifth sub-address by the flash abstraction layer to identify the channel available to the data processing operation in the flash memory;
(b) obtaining the second sub-address after the step (a) to identify the block available to the data processing operation in the flash memory;
(c) obtaining the third sub-address after the step (b) to identify the page available to the data processing operation in the flash memory;
(d) obtaining the fourth sub-address after the step (c) to identify the sector available to the data processing operation in the flash memory; and
(e) obtaining the first sub-address after the step (d) to identify the bank available to the data processing operation in the flash memory.

25. The method as claimed in claim 22, wherein the data processing flow comprises:
(a) obtaining the second sub-address by the flash abstraction layer to identify the block available to the data processing operation in the flash memory;

(b) obtaining the first sub-address after the step (a) to identify the bank available to the data processing operation in the flash memory;
(c) obtaining the third sub-address after the step (b) to identify the page available to the data processing operation in the flash memory;
(d) obtaining the fourth sub-address after the step (c) to identify the sector available to the data processing operation in the flash memory; and
(e) obtaining the fifth sub-address after the step (d) to identify the channel available to the data processing operation in the flash memory.

26. The method as claimed in claim 14, wherein the HTL is a flash translation layer.

27. A device for processing data of flash memory by separating levels, comprising;
a flash memory having multiple blocks;
a circuit for executing command and converting logical address for instructing a LAL to obtain hardware structure information of the flash memory and transmit the hardware structure information to a HTL, instructing the LAL to obtain a set of spare data of the flash memory and transmit the spare data to the HTL, instructing the HTL to receive a logical address and a request for a data processing operation in the flash memory, and instructing the HTL to convert the logical address into an intermediate physical address in accordance with the hardware structure information, select a set of physical storage units corresponding to the intermediate physical address in the flash memory with a look-up table in the HTL, identify a physical storage unit in the set of physical storage units available to the data processing operation in accordance with the spare data, and determine a data processing flow in accordance with the hardware structure information and the spare data to convert the logical address to a physical address corresponding to the physical storage unit available to the data processing operation; and
a circuit for executing command and addressing physical address used 22 for instructing the LAL to perform the data processing operation in the physical 23 storage unit available to the data processing operation in accordance with the 24 physical address transmitted from the HTL;
wherein the HTL is used to allow a client's application program and a file system to perform the data processing action in the flash memory, and collect related information about usage status of the flash memory to manage the flash memory, and LAL obtains a bank according to a first sub-address of the physical address, a block according to a second sub-address, a page according to a third sub-address, and a channel according to a fourth sub-address.

28. The device as claimed in claim 27, wherein the circuit for executing command and converting logical address further comprises:
a logical determination circuit for commanding the HTL to instruct the LAL to obtain one of the hardware structure information and the spare data, instructing the LAL to read and transmit one of the hardware structure information and the spare data to the HTL in accordance with the command, and instructing the HTL to determine the data processing flow in accordance with the hardware information and the spare data to convert the logical address into the physical address.

29. The device as claimed in claim 27, wherein the HTL is used to isolate an application program and requirement of entering the LAL sent from a file system.

30. The device as claimed in claim 27, wherein the LAL is located between the HTL and the flash memory to perform commands from the HTL and sends the hardware structure information and a spare data obtained from the flash memory to the HTL.

31. The device as claimed in claim 27, wherein the LAL executes commands from the HTL to avoid the commands of the HTL directly entering the flash memory and sends the hardware structure and spare data of the flash memory to the HTL.

32. The device as claimed in claim 27, wherein the LAL is replaced by a new LAL when the flash memory is replaced by a new flash memory, so that the new LAL obtains a new hardware structure information of the new flash memory and transmits the new hardware structure information to the HTL.

33. The device as claimed in claim 27, wherein the hardware structure information provides information to plan the flash memory to comprise a size of a bank, a size of a block, a size of a page, and a size of a channel.

34. The device as claimed in claim 33, wherein the data processing flow determines a sequence how the LAL fetches the first sub-address, the second sub-address, the third sub-address and the fourth sub-address.

35. The device as claimed in claim 34, wherein the data processing flow comprises:
(a) obtaining the first sub-address by the LAL to identify the bank available to the data processing operation in the flash memory;
(b) obtaining the second sub-address after the step (a) to identify the block available to the data processing operation in the flash memory;
(c) obtaining the third sub-address after the step (b) to identify the page available to the data processing operation in the flash memory; and
(d) obtaining the fourth sub-address after the step (c) to identify the channel available to the data processing operation in the flash memory.

36. The device as claimed in claim 34, wherein the data processing flow comprises:
(a) obtaining the fourth sub-address by the LAL to identify the channel available to the data processing operation in the flash memory;
(b) obtaining the second sub-address after the step (a) to identify the block available to the data processing operation in the flash memory;
(c) obtaining the third sub-address after the step (b) to identify the page available to the data processing operation in the flash memory; and
(d) obtaining the first sub-address after the step (c) to identify the bank available to the data processing operation in the flash memory.

37. The device as claimed in claim 34, wherein the data processing flow comprises:
(a) obtaining the second sub-address by the LAL to identify the block available to the data processing operation in the flash memory;
(b) obtaining the first sub-address after the step (a) to identify the bank available to the data processing operation in the flash memory;
(c) obtaining the third sub-address after the step (b) to identify the page available to the data processing operation in the flash memory; and
(d) obtaining the fourth sub-address after the step (c) to identify the channel available to the data processing operation in the flash memory.

38. The device as claimed in claim 27, wherein the LAL is a flash abstraction layer.

39. The device as claimed in claim 27, wherein the HTL is a flash translation layer.

* * * * *